(12) United States Patent
Dachiraju et al.

(10) Patent No.: US 9,749,668 B2
(45) Date of Patent: Aug. 29, 2017

(54) AUTOMATED ACCOUNT CREDITING AFTER INTERRUPTION OR FAILURE OF PAID CONTENT DELIVERY

(71) Applicant: Verizon Patent and Licensing Inc., Arlington, VA (US)

(72) Inventors: Nageswara Raju Dachiraju, Irving, TX (US); Jesus Martinez, Coppell, TX (US); Anil K. Guntupalli, Irving, TX (US); Viswas Ventrapragada, Coppell, TX (US); Pritam Bedse, Flower Mound, TX (US); Kanagaraj Vengidasamy, Tampa, FL (US); Mukunda Raju, Irving, TX (US); Bhanu Rongali, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/473,742

(22) Filed: Aug. 29, 2014

(65) Prior Publication Data

US 2016/0066002 A1    Mar. 3, 2016

(51) Int. Cl.

| | | |
|---|---|---|
| *H04N 21/2343* | (2011.01) |
| *H04N 21/2365* | (2011.01) |
| *H04N 21/238* | (2011.01) |
| *H04N 21/2383* | (2011.01) |
| *H04N 21/24* | (2011.01) |
| *H04N 21/442* | (2011.01) |
| *H04N 21/647* | (2011.01) |
| *H04N 21/466* | (2011.01) |
| *H04N 21/2543* | (2011.01) |
| *H04N 21/4784* | (2011.01) |
| *G06Q 10/00* | (2012.01) |
| *H04N 21/472* | (2011.01) |
| *H04N 21/475* | (2011.01) |

(52) U.S. Cl.
CPC ......... *H04N 21/2407* (2013.01); *G06Q 10/00* (2013.01); *H04N 21/2404* (2013.01); *H04N 21/2543* (2013.01); *H04N 21/44222* (2013.01); *H04N 21/4667* (2013.01); *H04N 21/4784* (2013.01); *H04N 21/4751* (2013.01); *H04N 21/47202* (2013.01)

(58) Field of Classification Search
None
See application file for complete search history.

(56) References Cited

U.S. PATENT DOCUMENTS

| | | | | |
|---|---|---|---|---|
| 2003/0110248 A1* | 6/2003 | Ritche | ................ | H04L 41/0613 709/224 |
| 2006/0026294 A1* | 2/2006 | Virdi | ................ | H04N 21/23406 709/232 |
| 2007/0256096 A1* | 11/2007 | Wilhelm | ............ | H04N 7/17318 725/34 |

(Continued)

*Primary Examiner* — Brian T Pendleton
*Assistant Examiner* — Jean D Saint Cyr

(57) ABSTRACT

One or more devices may receive activity logs from multiple set-top-boxes (STBs); determine that an outage has occurred based on the activity logs; identify one or more STBs, of the plurality of STBs, that failed to play back paid content during the outage, or where playback of paid content, by the one or more STBs, was interrupted during the outage; and credit corresponding accounts associated with the one or more STBs.

20 Claims, 11 Drawing Sheets

(56) References Cited

U.S. PATENT DOCUMENTS

| | | | |
|---|---|---|---|
| 2009/0144764 A1* | 6/2009 | Mehta | H04N 7/17318 |
| | | | 725/1 |
| 2009/0187939 A1* | 7/2009 | Lajoie | G06Q 30/02 |
| | | | 725/34 |
| 2010/0217837 A1* | 8/2010 | Ansari | G06Q 30/04 |
| | | | 709/218 |
| 2011/0022606 A1* | 1/2011 | Mason | G06Q 30/02 |
| | | | 707/748 |
| 2011/0289526 A1* | 11/2011 | Poole | H04N 7/17318 |
| | | | 725/14 |
| 2013/0130642 A1* | 5/2013 | Joul | H04L 41/5064 |
| | | | 455/406 |

\* cited by examiner

AUTOMATED ACCOUNT CREDITING AFTER INTERRUPTION OR FAILURE OF PAID CONTENT DELIVERY

BACKGROUND

A Set-Top Box (STB), or Set-Top Unit (STU) is an information appliance device that may include a television tuner that receives an external signal and that extracts ("tunes") television content, for display by a television or other display device, from the external signal. An STB may be used to access paid content, such as "on-demand" content, live broadcasted "pay-per-view" content, etc. A user may request paid content, and the paid content may be provided to the user via the STB once a payment transaction has been completed.

DETAILED DESCRIPTION OF THE PREFERRED EMBODIMENTS

The following detailed description refers to the accompanying drawings. The same reference numbers in different drawings may identify the same or similar elements.

Users may access paid content, such as movie rentals, pay-per-view programming, etc., via set-top-boxes (STBs). For example, the STB may implement a content platform from which a user may navigate to select paid content for viewing (e.g., via menus, guides, and search tools within the content platform). If playback of paid content fails after payment for the content has been made, a user may wish to receive a refund to offset the amount paid. In order to obtain a refund, the user may ordinarily need to contact a billing and/or a support department, associated with a provider of the paid content in order to request the refund.

Systems and/or methods, as described herein, may identify an outage event, during playback of paid content, and may automatically credit an account of a user who purchased the paid content. As a result, customer satisfaction may be improved over implementations where a user is required to actively request a refund/credit.

Figure 1:
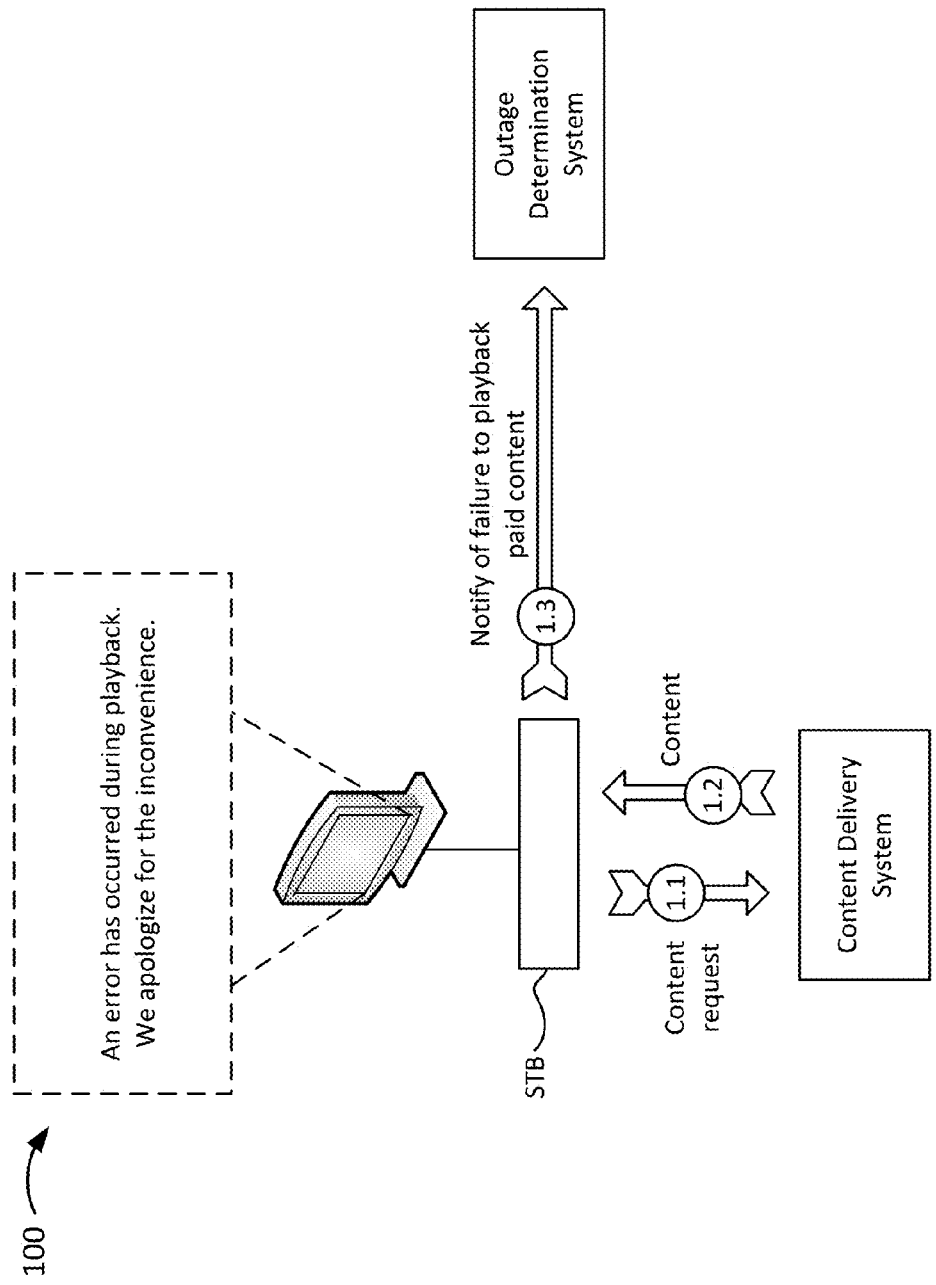
FIGS. 1 and 2 illustrate an example overview of an implementation described herein.
Figure 2:
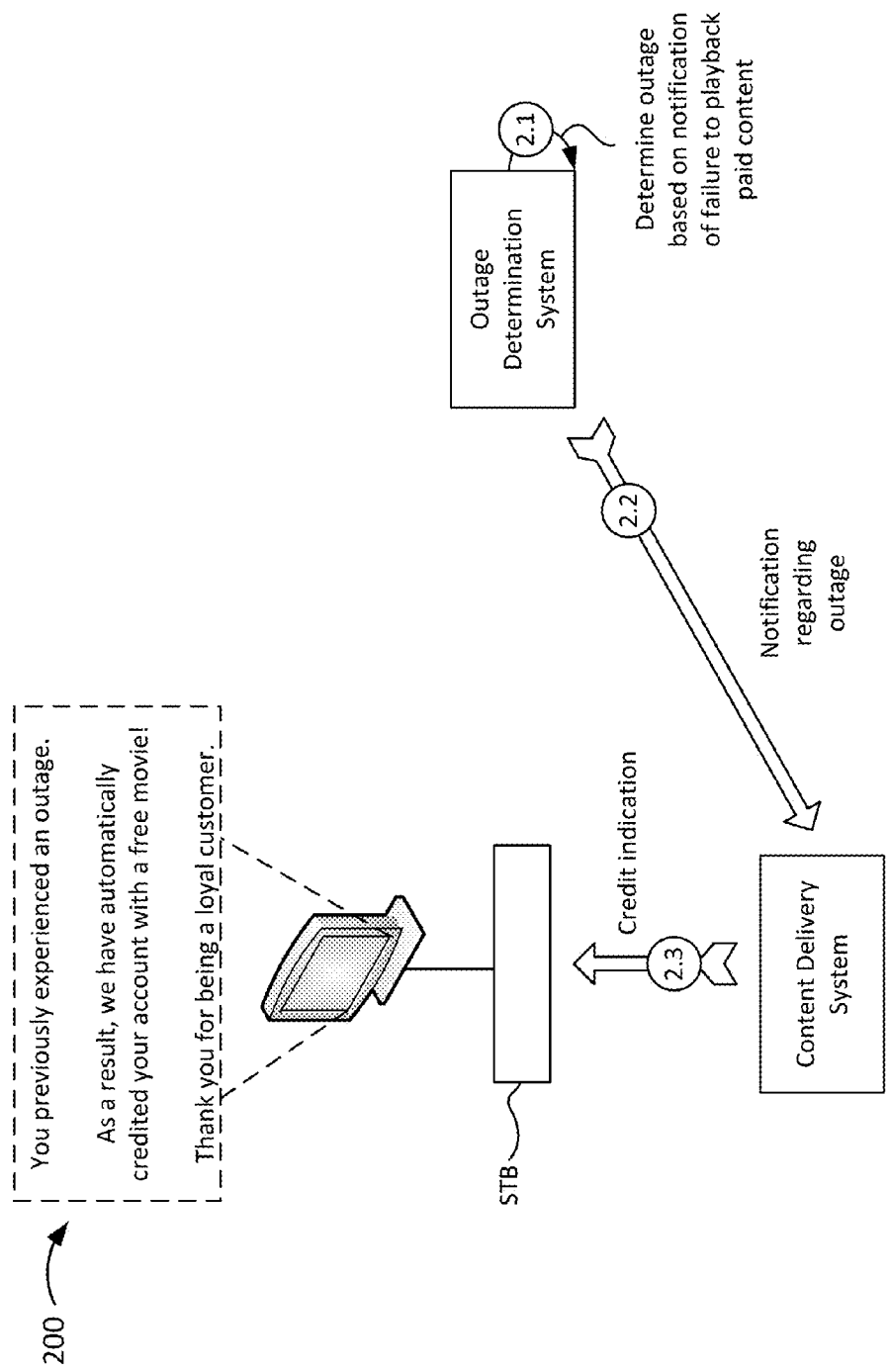

FIGS. 1 and 2 illustrate an example overview of an implementation described herein. As shown in FIG. 1, an STB may request content from a content delivery system (arrow 1.1). For example, the STB may request the content in response to receiving a selection for paid content from a user. Based on receiving the request, the content delivery system may provide the selected content to the STB (arrow 1.2). The STB may begin playback of the content (e.g., via an associated display, such as a television) as the STB receives the content from the content delivery system (e.g., streaming).

During playback of the content, assume that playback fails as a result of an outage event. For example, playback may fail as a result of a network outage resulting in the streaming of the content to discontinue. Additionally, or alternatively, the playback may fail when the content file is corrupt or defective. As shown in FIG. 1, the an error message indicating that playback has failed may be displayed. The STB may notify (arrow 1.3) an outage determination system that the playback of the paid content has failed.

Referring to FIG. 2, the outage determination system may determine that an outage has occurred based on the received notification (arrow 2.1). In some implementations, the outage determination system may determine that an area-wide outage has occurred when receiving notifications indicating playback errors from multiple other STBs within a particular geographic region (e.g., within a particular zip code, county, etc.). For example, the outage determination system may receive the notifications of playback errors from multiple other STBs within a particular geographic region when an area-wide outage has occurred. Additionally, or alternatively, the outage determination system may determine that a content-specific outage has occurred when receiving notifications indicating playback errors from multiple other STBs that experienced an outage when playing back a particular content title. For example, the outage determination system may receive the notifications of playback errors from multiple other STBs that experienced an outage when playing back a particular content title when the particular content title is damaged or corrupt.

The outage determination system may identify particular accounts associated with STBs that experienced outages, such as the STB shown in FIGS. 1 and 2, and may notify, to the content delivery system, that the STB has experienced an outage (arrow 2.2). Based on receiving the notification, the content delivery system may notify the STB that a credit has been issues to a user account of the STB (arrow 2.3). The content delivery system may also notify other STBs that were affected by the outage that credits have been issued to respective user accounts of the affected STBs. In some implementations, the content delivery system may also indicate that the user account has been credited via an e-mail to users associated with affected accounts (e.g., accounts associated with STBs that experienced the outage). The STB may display the credit notification (interface 200) to notify the user that the user's account has been credited (e.g., in the form of a free content rental, or a cash credit to the user's account).

Figure 3:
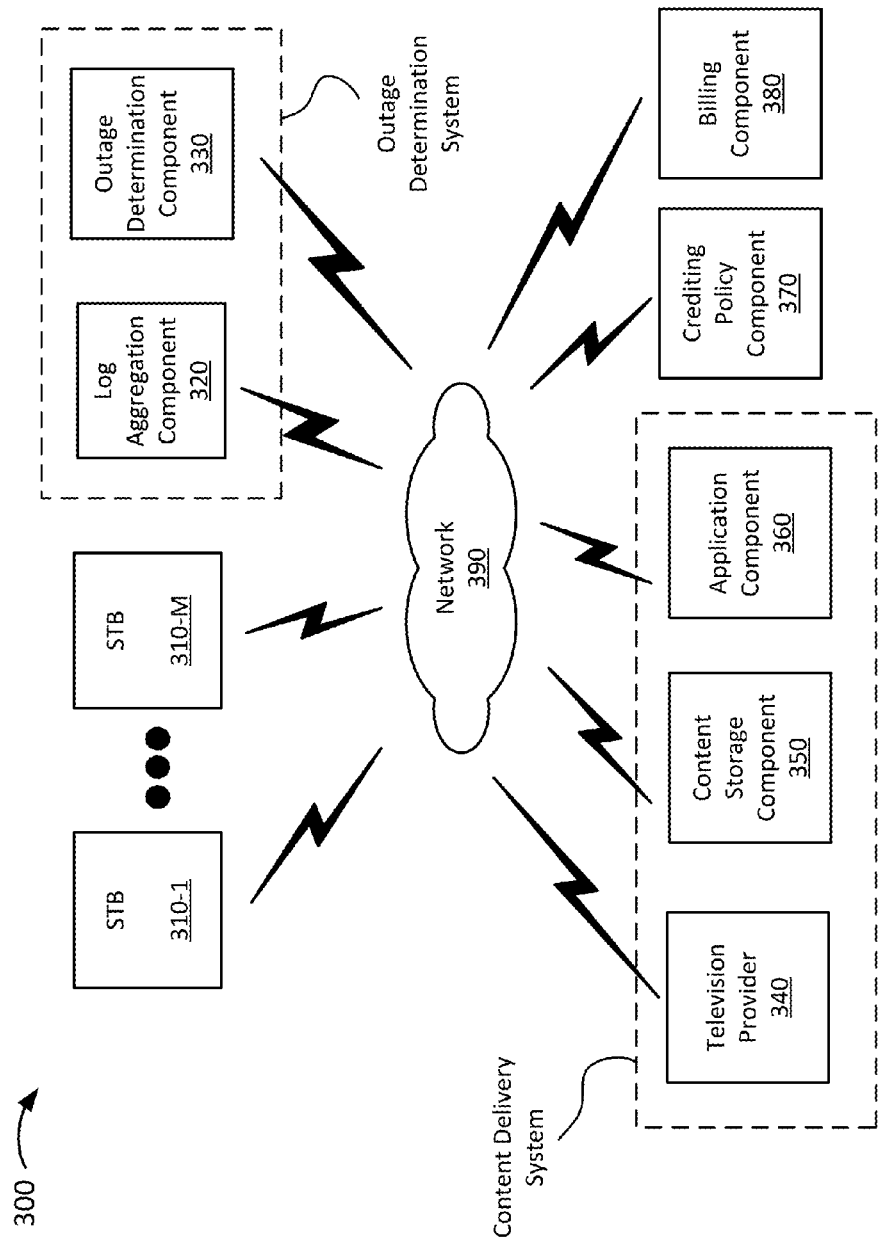
FIG. 3 illustrates an example environment in which systems and/or methods, described herein, may be implemented.

FIG. 3 is a diagram of an example environment 300 in which systems and/or methods described herein may be implemented. As shown in FIG. 3, environment 300 may include STBs 310-1 through 310-M (where M is an integer greater than or equal to 1), log aggregation component 320, outage determination component 330, television provider 340, content storage component 350, application component 360, crediting policy component 370, billing component 380, and network 390. As further shown in FIG. 3, environment 300 may include an outage determination system and a content delivery system. Outage determination system may include log aggregation component 320 and/or outage determination component 330. Content delivery system may include television provider 340, content storage component 350, and/or application component 360.

STB 310 may include one or more tuners to receive a television signal from television provider 340 and to extract (tune) a particular television channel from the television signal. In some implementations, STB 310 may decode and/or unscramble television signals in order to present content associated with the television signals. STB 310 may be connected to network 380 via a wired connection, such as a coaxial cable connection using Multimedia over Coax Alliance (MoCA) standards, and/or a wireless (e.g., Wi-Fi) connection.

STB 310 may implement a content platform from which a user may select to view content. STB 310 may communicate with television provider 340 and/or content storage component 350 to obtain requested content. STB 310 may communicate with application component 360 to present a programming guide from which television channels may be selected and/or from which live broadcasted pay-per-view content may be ordered. Additionally, or alternatively, STB 310 may communicate with application component 360 to present "on-demand" content that the user of STB 310 may select to view. STB 310 may generate activity logs indicating user interactions with STB 310 (e.g., television channels selected, "on-demand" content selected, etc.). In some implementations, the activity logs may include error codes to indicate playback errors, such as when playback of paid content has failed. STB 310 may output the activity logs to log aggregation component 320.

As used herein, the term "set-top box" may refer to a device that may receive content from a service provider and/or a connected display (e.g., a television, a monitor, etc.). Operations described as being performed by the set-top-box may be performed by the connected display. For example, when describing that the set-top-box may display content, in practice, the set-top-box may output, to the connected display, data relating to the content, and the connected display may present the content.

Log aggregation component 320 may include one or more computing devices, such as a server device or a collection of server devices that may receive activity logs and/or error notifications from multiple different STBs 310. Log aggregation component 320 may select activity logs and/or error logs, received from STBs 310, indicating that delivery of paid content was interrupted for greater than a threshold period of time. For example, if an activity log and/or error log indicates that delivery of paid content was interrupted for a relatively short duration, log aggregation component 320 may not select these activity logs and/or error log. The selected activity logs (i.e., "error logs"), indicating that playback of paid content was interrupted for greater than a threshold period of time (or failed altogether), may be output to outage determination component 330.

Outage determination component 330 may include one or more computing devices, such as a server device or a collection of server devices. In some implementations, outage determination component 330 may receive error logs from log aggregation component 320. Outage determination component 330 may group the error logs by geographic area to determine whether an outage event has occurred in a geographic area. Additionally, or alternatively, outage determination component 330 may group the error logs by content title to determine an outage event associated with a particular content title (e.g., a particular movie, a particular pay-per-view broadcast, etc.). Outage determination component 330 may communicate with external systems to confirm the occurrence of an outage event, identify particular user accounts affected by the outage event, and output information identifying the affected user accounts to application component 360 and/or crediting policy component 370.

Television provider 340 may represent a cable television provider, satellite television provider, an over-the-air antenna television provider, or other entity that provides content via television channels to STB 310 (e.g., via a television tuner of STB 310). Television provider 340 may output decoding information to STB 310 to permit STB 310 to decode and present the pay-per-view content (e.g., based on receiving an instruction from application component 360 to output the decoding information when application component 360 receives a request for the pay-per-view content from STB 310).

Content storage component 350 may include one or more computing devices, such as a server device or a collection of server devices that may store content that a user may access (e.g., "on-demand" content). The "on-demand" content may include content that is provided by a television provider 340. Additionally, or alternatively, "on-demand" content may include Internet-based content associated with an internet-based content provider (e.g., a content streaming provider). Content storage component 350 may output particular content based on receiving an instruction from application component 360 to output the particular content.

Application component 360 may include one or more computing devices, such as a server device or a collection of server devices that may provide a programming guide from which television content may be selected. Additionally, or alternatively, application component 360 may provide a content platform from which "on-demand" content may be selected. Application component 360 may receive selections of content presented in a guide and/or content platform. Based on receiving a selection, from STB 310, for access to pay-per-view content, application component 360 may output information regarding the selection to billing component 380 (e.g., to direct billing component 380 to debit an account associated with STB 310 corresponding to charge amount for the pay-per-view content), and direct television provider 340 to output decoding information for the pay-per-view content to STB 310. Based on receiving a selection, from STB, for paid "on-demand" content, application component 260 may output information regarding the selection to billing component 380 (e.g., to direct billing component 380 to debit an account associated with STB 310 corresponding to charge amount for the paid content), and direct content storage component 350 to output the paid content to STB 310.

Application component 360 may receive indications of outage events from outage determination component 330. Application component 360 may further receive policies from crediting policy component 370 identifying rules for crediting accounts (e.g., rules indicating a maximum credit benefit for an account for a particular time period). Based on receiving the outage event indications and the policies, application component 360 may determine accounts that should be credited, a form of the credit (e.g., a cash credit, a content credit, etc.), and the amount of the credit. Application component 360 may output the credit information to billing component 380 so that billing component 380 may credit the determined accounts. In some implementations, application component 360 may store information identifying content credits, while outputting information identifying cash credits to billing component 380.

Crediting policy component 370 may include one or more computing devices, such as a server device or a collection of server devices that may store information identifying maximum credit benefits for an account. For example, crediting policy component 370 may store information identifying that a particular account may receive a maximum of two content credits in a given month. As another example, crediting policy component 370 may store information identifying that a particular account may receive a maximum of $10 in cash credits in a given month. As another example, crediting policy component 370 may store information identifying that a particular account may receive a maximum of $5 in cash credits in a given month and a maximum of 1 content credit in the same month. In some implementations, the maximum credit benefits for an account may be based on a subscription level of the account, a measure of customer loyalty of the account, and/or based on other information. In some implementations, the amount of the credit and/or the form of the credit may also be based on a type of paid content whose delivery was interrupted or failed. For example, "on-demand" content may be credited in the form of a content credit, whereas live broadcasted pay-per-view content may be credited in the form of a cash credit.

Billing component 380 may include one or more computing devices, such as a server device or a collection of server devices that may store billing information for an account associated with STB 310. Billing component 380 may assess debit transactions to the account based on requests for paid content (e.g., paid "on-demand" content and/or pay-per-view content). In some implementations, the requests may be received from STB 310 via application component 360. After issuing a debit, billing component 380 may output an indication, to application component 360, that the debit has been assessed, and application component 360 may then direct content storage component 350 to output selected "on-demand" content, or direct television provider 340 to output decoding information for pay-per-view content. Billing component 380 may receive an instruction, from application component 360, to credit an account of STB 310 (e.g., after application component 360 receives an outage indication and determines the credit amount).

Network 390 may include one or more wired and/or wireless networks. For example, network 390 may include a cellular network (e.g., a second generation (3G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 390 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, a television network, and/or a combination of these or other types of networks.

The quantity of devices and/or networks in environment 300 is not limited to what is shown in FIG. 3. In practice, environment 300 may include additional devices and/or networks; fewer devices and/or networks; different devices and/or networks; or differently arranged devices and/or networks than illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 4:
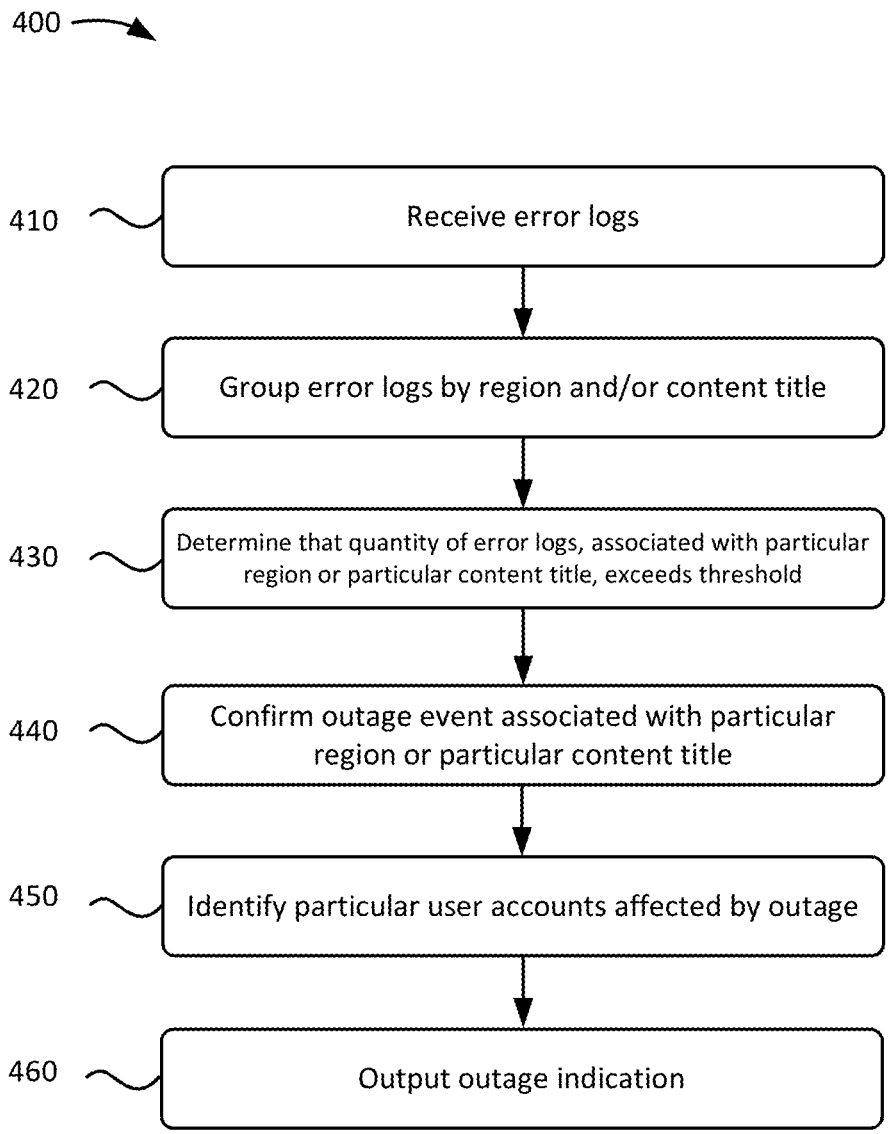
FIG. 4 illustrates a flowchart of an example process for identifying an outage event.

FIG. 4 illustrates a flowchart of an example process 400 for detecting an outage associated with content delivery. In some implementations, process 400 may be performed by outage determination component 330. In some implementations, some of process 400 may be performed by one or more other devices in addition to, or in lieu of outage determination component 330.

As shown in FIG. 4, process 400 may include receiving error logs (block 410). For example, outage determination component 330 may receive error logs from log aggregation component 320. In some implementations, log aggregation component 320 may select activity logs and/or error logs, received from STBs 310, indicating that delivery of paid content was interrupted for greater than a threshold period of time. For example, if an activity log and/or error logs indicates that delivery of paid content was interrupted for a relatively short duration, log aggregation component 320 may not select these activity logs. The selected activity logs (i.e., error logs), indicating that playback of paid content was interrupted for greater than a threshold period of time (or failed altogether), may be output to outage determination component 330. In some implementations, an error log may identify that playback of particular content having a particular title was interrupted or failed. Additionally, or alternatively, the error log may identify a particular STB 310 associated with the error log.

Process 400 may also include grouping the error logs by region and/or content title (block 420). For example, outage determination component 330 may group or sort the error logs based on geographic region and/or based on a title of content associated with the error logs. As an example, outage determination component 330 may group the error logs that originated from STBs 310 associated with a particular region (e.g., STBs 310 located in a particular zip code, town, county, etc.). As another example, outage determination component 330 may group the error logs associated with a particular content title (e.g., indicating a possible defect with delivery of the content having the particular content title).

Process 400 may further include determining that the quantity of error logs, associated with a particular region or a particular content title has exceeded a threshold (block 430). As an example, outage determination component 330 may determine that the quantity of error logs associated with a particular region has exceeded a particular threshold, such as a threshold of 200 logs (e.g., indicating a possible network outage that affected the particular region). Additionally, or alternatively, outage determination component 330 may determine that the ratio of error logs, associated with the particular region, to the quantity of STBs 310 or accounts associated with the particular region, has exceeded a particular threshold percentage. As an example, outage determination component 330 may determine that the ratio of error logs to the quantity of STBs 310 for the particular region has exceed a particular threshold percentage, such as 20% of STBs 310 reported an error (e.g., indicating a possible network outage event that affected the particular region). Additionally, or alternatively, outage determination component 330 may determine that the quantity or ratio of error logs, associated with a particular content title, has exceeded a particular threshold (e.g., indicating a possible outage event preventing the delivery of the content having the particular content title).

Process 400 may include confirming an outage event associated with the particular region or particular content title (block 440). For example, outage determination component 330 may communicate with STBs 310 associated with the error logs to obtain additional information (e.g., from activity logs of the STBs) that may confirm that an outage event occurred. In some implementations, an operator of outage determination component 330 may conduct a series of tests and/or troubleshooting procedures to confirm whether an outage occurred. In some implementations, outage determination component 330 may communicate with external systems (e.g., external troubleshooting and/or diagnostic systems associated with a service provider of STBs 310), to confirm that an outage has occurred.

In some implementations, block 440 may be omitted. For example, an outage event, associated with a particular region or a particular content title, may be determined solely based on the quantity or percentage of error logs satisfying a threshold, as described above with respect to block 430.

Process 400 may also include identifying particular user accounts affected by the outage (block 450). For example, outage determination component 330 may identify the particular user accounts affected by the outage. As an example, assume that outage determination component 330 determined that an outage affected STBs 310 associated with a particular region. Given this assumption, outage determination component 330 may identify user accounts associated with users having service in the particular region. Further, outage determination component 330 may identify those user accounts associated with STBs that had delivery of the paid content interrupted or delivery of the paid content fail during the outage. As another example, assume that outage determination component 330 determined that an outage affected STBs 310 that were receiving particular content of a particular content title. Given this assumption, outage determination component 330 may identify user accounts associated with STBs 310 that had delivery of the particular content interrupted or delivery of the content fail during the outage.

Process 400 may further include outputting an outage indication (block 460). For example, outage determination component 330 may output the outage indication to application component 360. In some implementations, the outage indication may identify user accounts that were affected by an outage event. The outage indication may also identify the title of the content that interrupted or failed to play back as a result of the outage. The outage indication may also identify a price of the paid content. The outage indication may also identify a type of the paid content (e.g., "on-demand" content, live broadcasted PPV content, etc.).

Figure 5:
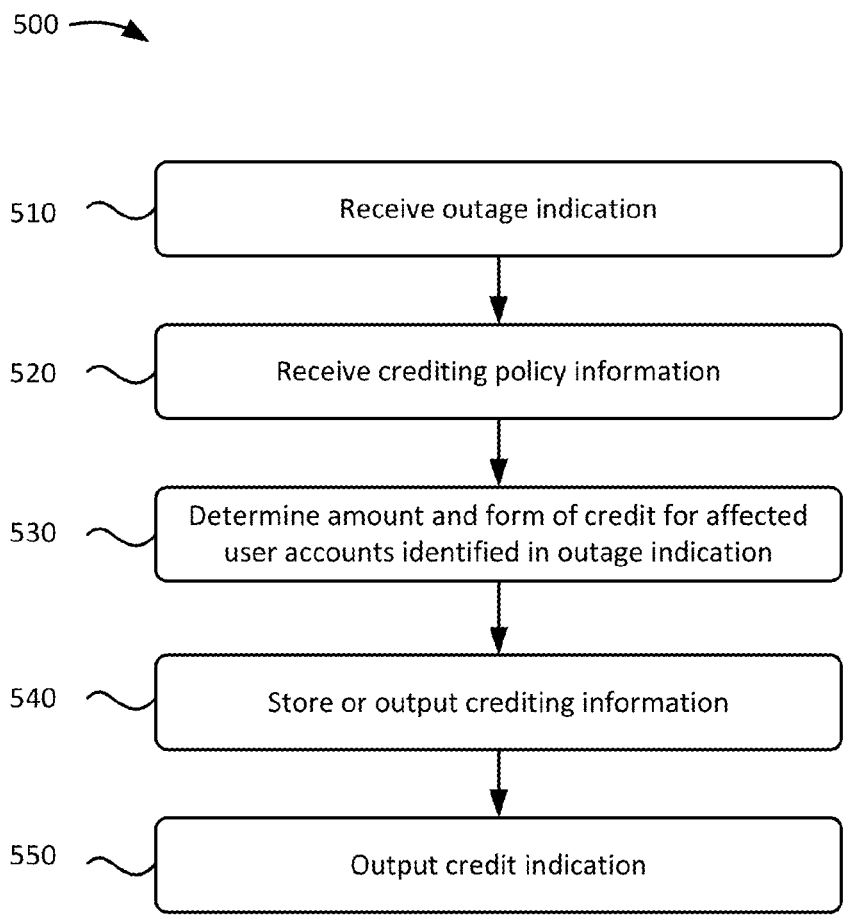
FIG. 5 illustrates a flowchart of an example process for determining user accounts to credit as the result of the outage event.

FIG. 5 illustrates a flowchart of an example process 500 for determining user accounts to credit as the result of an outage event. In some implementations, process 500 may be performed by application component 360. In some implementations, some or all of blocks of process 500 may be performed by one or more other devices.

As shown in FIG. 5, process 500 may include receiving an outage indication (block 510). For example, application component 360 may receive the outage indication from outage determination component 330 as described above with respect to block 460.

Process 500 may further include receiving crediting policy information (block 520). For example, application component 360 may receive crediting policy information from crediting policy component 370. As described above with respect to FIG. 3, the crediting policy information may identify maximum credit benefits for a user account. As an example, the crediting policy information may identify that a particular user account may receive a maximum of two content credits in a given month. As another example, crediting policy component 370 may store information identifying that a particular user account may receive a maximum of $10 in cash credits in a given month. As another example, crediting policy component 370 may store information identifying that a particular user account may receive a maximum of $5 in cash credits in a given month and a maximum of 1 content credit in the same month. In some implementations, the maximum credit benefits for a user account may be based on a subscription level of the user account, a measure of customer loyalty of the user account, and/or based on other information. In some implementations, the amount of the credit and/or the form of the credit may also be based on a type of paid content whose delivery was interrupted or failed. For example, "on-demand" content may be credited in the form of a content credit, whereas live broadcasted pay-per-view content may be credited in the form of a cash credit.

Process 500 may also include determining an amount and form of credit for the affected user accounts identified in the outage indication (block 530). For example, for each user account identified in the outage indication, application component 360 may determine an amount to credit each account, and the form in which to credit the account (e.g., a cash credit or a content credit). For a particular user account, identified in the outage indication, application component 360 may determine any credits applied to the account in the current billing cycle, an amount of the credits applied, a subscription level of the account, a measure of customer loyalty associated with the account, and/or other information regarding the account. Application component 360 may further determine maximum credit benefits for the account based on the crediting policy information. As an example, application component 360 may determine that a maximum cash credit of $10 or a maximum quantity of 2 content credits may be applied to the account (e.g., based on the crediting policy information, subscription level, and/or measure of customer loyalty).

If, for example, the maximum benefit for the account has been not reached (e.g., for a particular billing cycle), then application component 360 may determine that a credit should be applied to the account. Application component 360 may determine that the credit should be applied as either a cash credit, a content credit, or a combination of both cash and content credits. For example, application component 360 may apply the credit as a cash credit if the maximum cash credit benefit for the account has not been reached. Application component 360 may apply the credit as a content credit if the maximum cash credit benefit for the account has been reached, but the maximum content credit benefit has not been reached. In some implementations, application component 360 may apply the credit as either a cash or content credit based on the type of content identified in the outage indication. In some implementations, application component 360 may determine that a credit may not be applied if a total maximum credit benefit for the account has been reached. In some implementations, credits may be applied to affected user account without regard to crediting policy information, and without regard to maximum credit benefit information.

Process 500 may further include storing or outputting crediting information (block 540). For example, application component 360 may output crediting information (e.g., information identifying a user account to credit, the amount of the credit, and the form of the credit) to billing component 380. Based on receiving the crediting information, billing component 380 may apply a credit to the user account. In some implementations, application component 360 may store crediting information for content credits. For example, application component 360 may store content credits for a user account, and may deduct these credits when a user of the user account requests paid content.

Process 500 may also include outputting a credit indication (block 550). For example, application component 360 may output the credit indication to STB 310. STB 310 may display the credit indication as a message to notify the user of STB 310 that a credit has been applied as a result of an outage event during playback of paid content. The credit indication may identify the amount and the form of the credit. In some implementations, application component 360 may also output the credit indication to a user of the user account via e-mail, text message, or the like.

Figure 6:
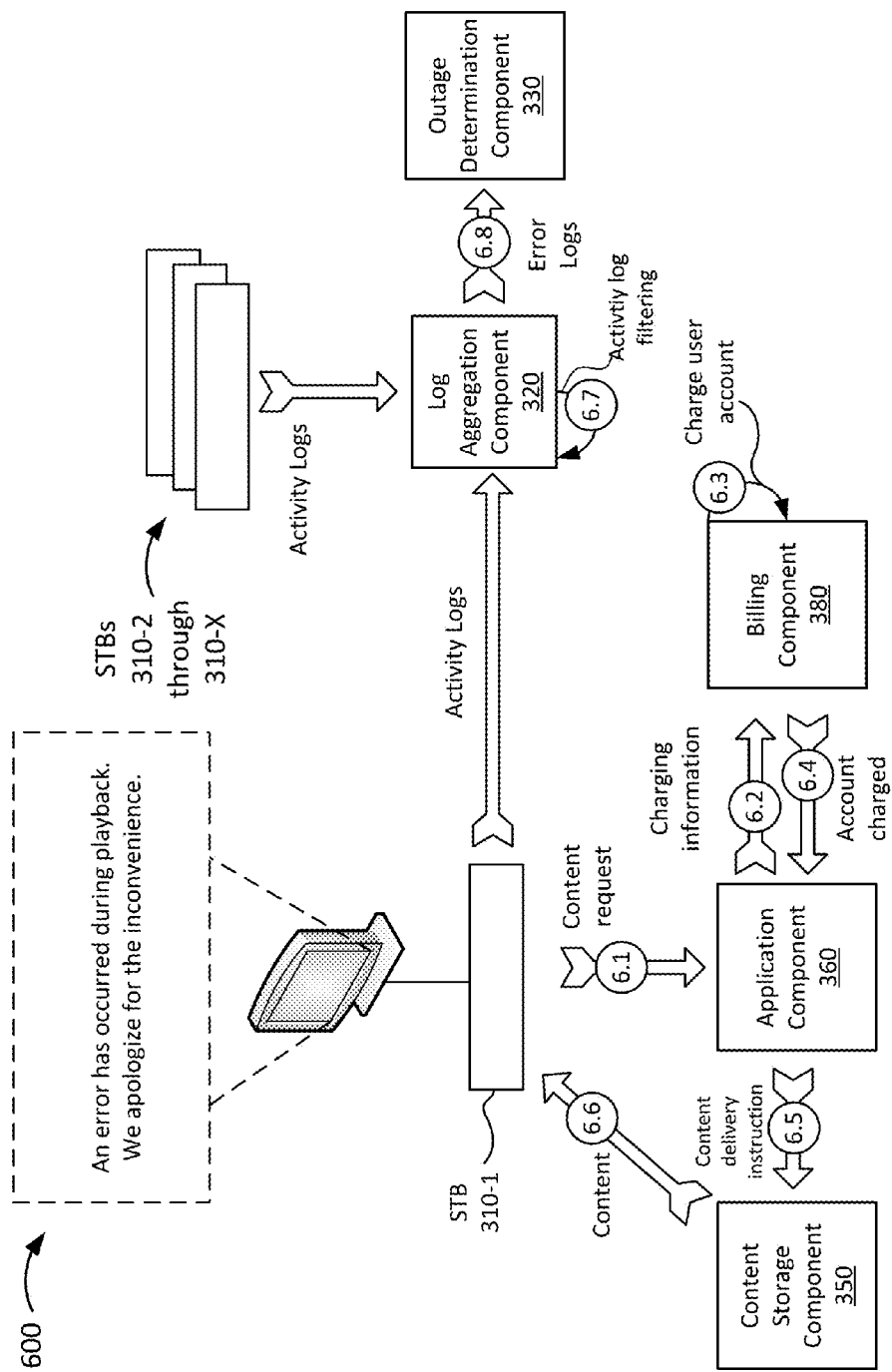
FIGS. 6-10 illustrate example implementations for applying content and cash credits to a user account in response to an outage event during the playback of paid content.

FIGS. 6-10 illustrate example implementations for applying content and cash credits to a user account in response to an outage event during the playback of paid content. In FIG. 6, STBs 310 (e.g., STB 310-1 through STB 310-X, where X is an integer greater than or equal to 2) may periodically output activity logs to log aggregation component 320. As shown in FIG. 6, a particular STB 310 (e.g., STB 310-1) may output a content request to application component 360 (arrow 6.1). For example, STB 310-1 may output the content request when a user of STB 310-1 requests the content via a content platform of STB 310-1. In FIG. 6, assume that the request is for paid content (e.g., paid "on-demand" content stored by content storage component 350).

As further shown in FIG. 6, application component 360 may output charging information to billing component 380 (arrow 6.2). The charging information may direct billing component 380 to apply a charge to a user account of STB 310 (e.g., a charge corresponding to a price of the requested paid content). Based on receiving the charging information, billing component 380 may apply a charge to the user account (arrow 6.3), and output an indication that the user account has been charged (arrow 6.4). Application component 360 may then output a content delivery instruction to content storage component 350 (arrow 6.5), and content storage component 350 may output (or attempt to output) the requested content to STB 310 (arrow 6.6). In FIG. 6, assume that playback of the content has been interrupted for greater than a threshold period of time, or has failed altogether (as reflected in interface 600). Given this assumption, the activity logs outputted by 310-1 may indicate that playback of the content has been interrupted for greater than a threshold period of time, or has failed altogether. Log aggregation component 320 may also receive the activity logs from STB 310-1 and from other STBs 310 (e.g., STBs 310-2 through 310-X). Log aggregation component 320 may filter the activity logs (arrow 6.7) and output, to outage determination component 330, error logs indicating that playback of paid content has been interrupted for greater than a threshold period of time, or has failed altogether (arrow 6.8). For example, the error logs may indicate that the playback of paid content has been interrupted for greater than a threshold period of time, or has failed altogether for multiple different STBs 310 that have attempted to playback paid content.

Figure 7:
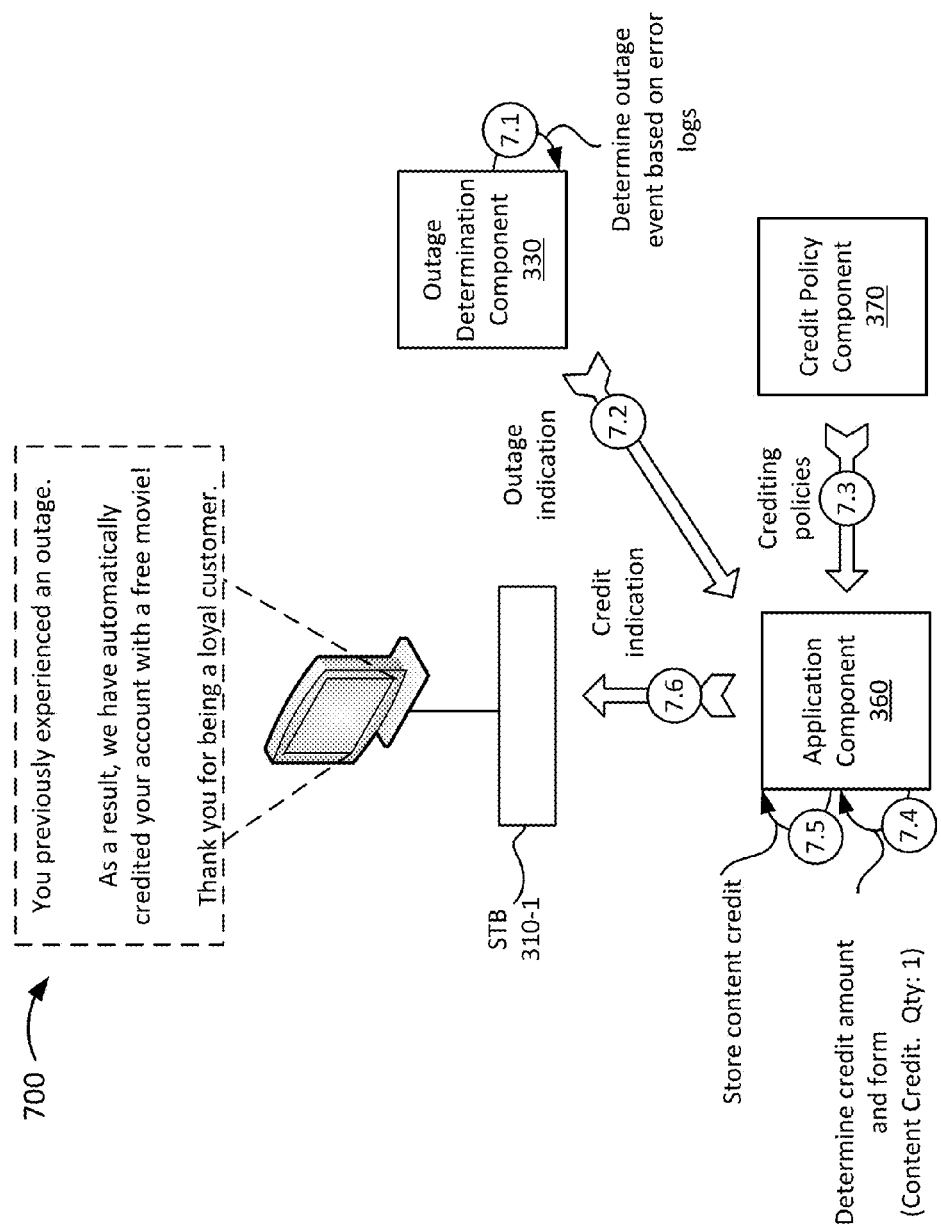

Referring to FIG. 7, outage determination component 330 may determine an outage event based on the error logs (arrow 7.1). For example, outage determination component 330 may determine the outage event when greater than a threshold quantity of error logs, associated with a particular region, have been received. Additionally, or alternatively, outage determination component 330 may determine the outage event when greater than a threshold quantity of error logs, associated with a particular content title, have been received. Outage determination component 330 may output an outage indication to application component 360 indicating the affected user accounts. For example, the outage indication may identify user accounts associated with the particular region and associated with STBs 310 that had delivery of the paid content interrupted or delivery of the content fail during the outage. Additionally, or alternatively, the outage indication may identify user accounts associated with STBs 310 that had delivery of the particular content, of a particular title, interrupted or had delivery of the particular content fail during the outage. In FIG. 7, assume that the outage indication identifies the user account associated with STB 310-1.

Application component 360 may also receive crediting policies from crediting policy component 370 (arrow 7.3). Based on the outage indication and the crediting policies, application component 260 may determine that the account associated with STB 310-1 should be credited in the form of a single content credit (arrow 7.4). Application component 360 may store the content credit for the user account (arrow 7.5). Additionally, or alternatively, application component 360 may output the content credit to be applied to the account by billing component 380. Application component 360 may also output a credit indication to STB 310-1 (arrow 7.6), and STB 310-1 may display the credit indication (interface 700). STB 310-1 may display the credit indication to notify the user of the content credit.

Figure 8:
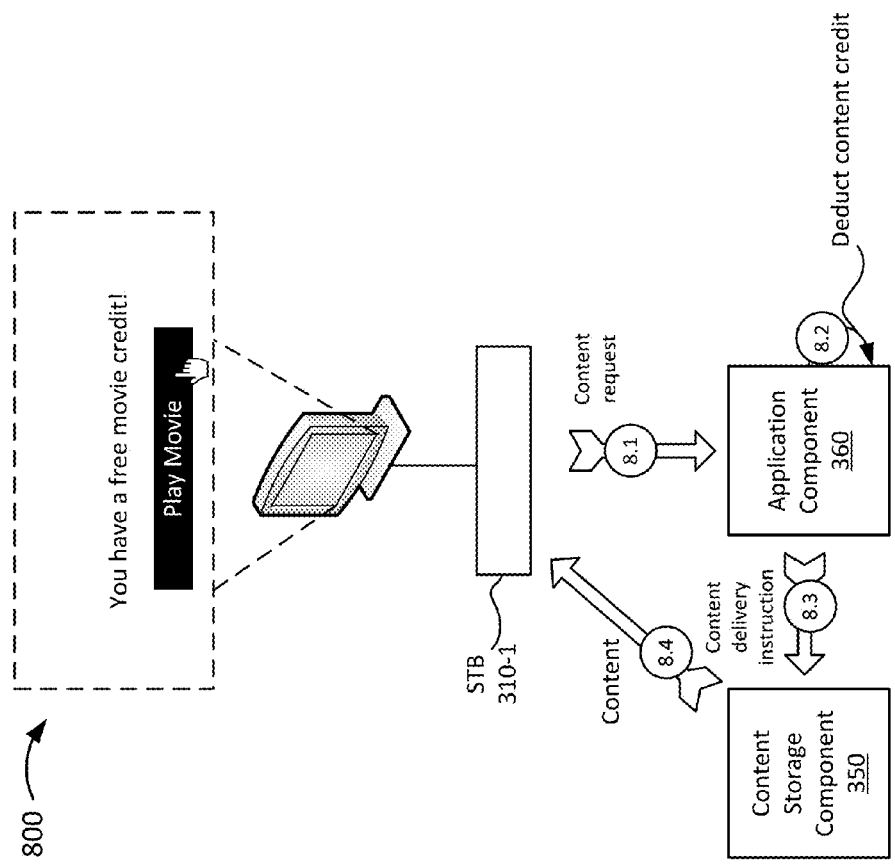

Referring to FIG. 8, STB 310-1 may output a request for paid content (arrow 8.1) when the user of STB 310-1 requests the paid content. Since a content credit has been applied to the user account, application component 360 may deduct the content credit (arrow 8.2), and output an instruction to direct content storage component 350 to deliver the content after deducting the content credit (arrow 8.3). Content storage component may then deliver the content to STB 310-1 (arrow 8.4).

Figure 9:
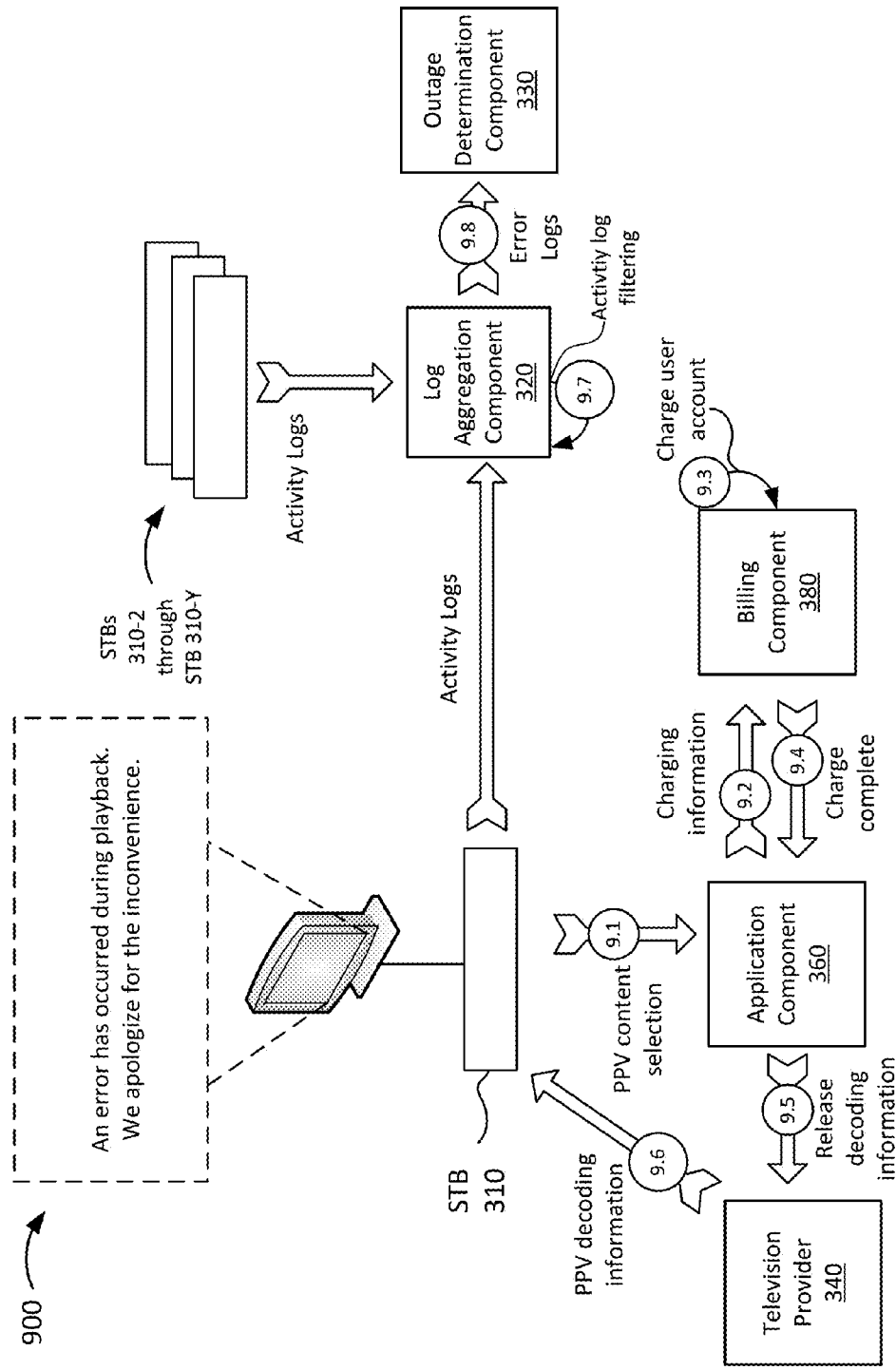
Figure 11:
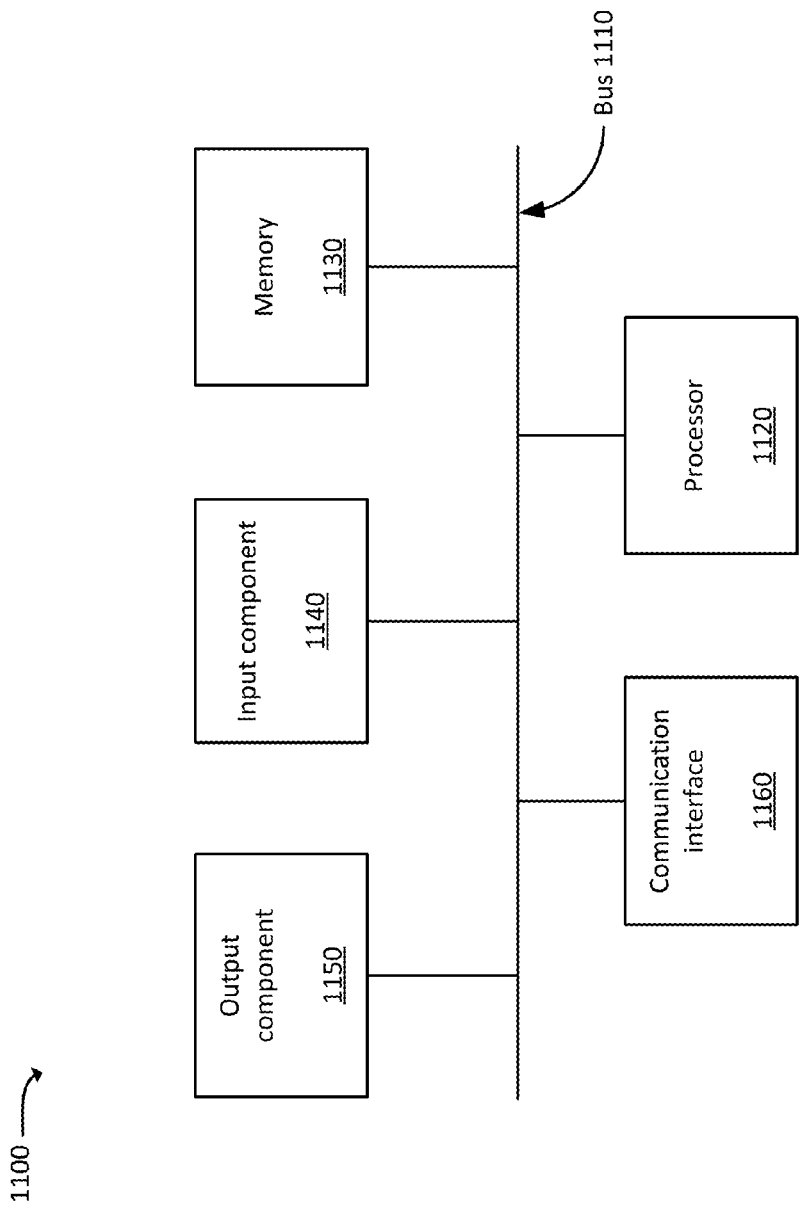
FIG. 11 illustrates example components of one or more devices, according to one or more implementations described herein.

Referring to FIG. 9, STB 310-1 STBs 310 (e.g., STB 310-1 through STB 310-Y, where Y is greater than or equal to 2) may periodically output activity logs to log aggregation component 320. As shown in FIG. 11, a particular STB 310 (e.g., STB 310-1) may output a request for live broadcast pay-per-view content to application component 360 (arrow 9.1). Application component 360 may output charging information to billing component 380 indicating an amount to charge an account of STB 310-1 corresponding to the request for the pay-per-view content (arrow 9.2). Billing component 380 may charge the account (arrow 9.3), and indicate, to application component 360, that the charge has been competed (arrow 9.4). Application component 360 may then direct television provider 340 to release decoding information to STB 310-1 so that STB 310-1 may unscramble and/or decode the pay-per-view content (arrow 9.5), and television provider 340 may output the decoding information.

In FIG. 9, assume that playback of the pay-per-view content has been interrupted for greater than a threshold period of time, or has failed altogether (interface 900). Given this assumption, the activity logs outputted by 310-1 may indicate that playback of the content has been interrupted for greater than a threshold period of time, or has failed altogether. Log aggregation component 320 may receive the activity logs from STB 310-1 and from other STBs 310 (e.g., STBs 310-2 through 310-X). Log aggregation component 320 may filter the activity logs (arrow 9.7). Log aggregation component 320 may output, to outage determination component 330, error logs indicating that playback of paid content has been interrupted for greater than a threshold period of time, or has failed altogether (arrow 9.8).

Figure 10:
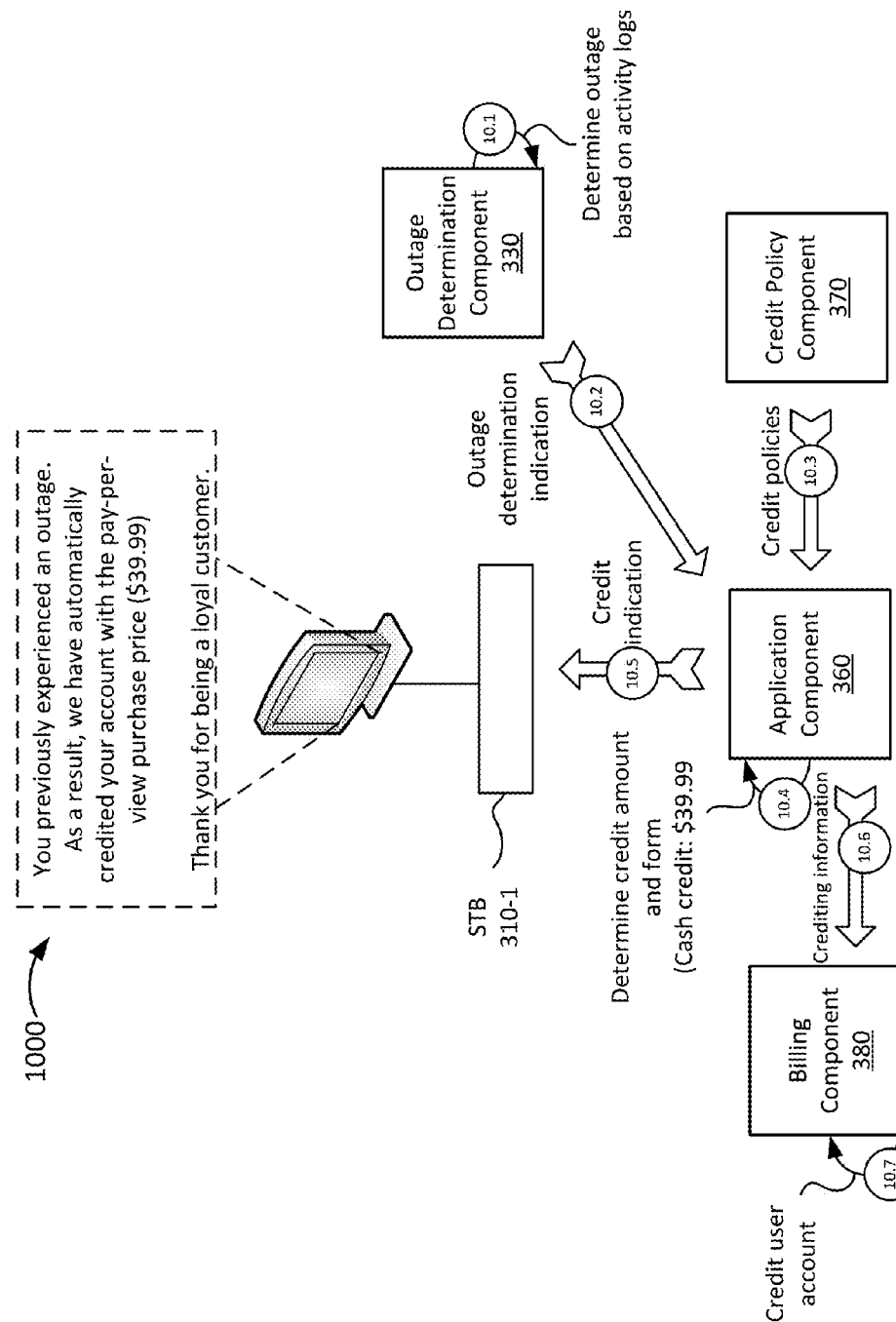

Referring to FIG. 10, application component 360 may determine that a cash credit for a user account should be applied after an outage event during which STB 310-1 had delivery of paid content (e.g., live broadcast pay-per-view content) interrupted or fail. As shown in FIG. 10, outage determination component 330 may determine an outage based on error logs (arrow 10.1), output an outage indication (arrow 10.2), receive crediting policies (arrow 10.3), and determine that a cash credit should be applied to the account associated with STB 310-1. Application component 360 may output a credit indication to STB 310-1 (arrow 10.5), and STB 310-1 may display the credit indication (interface 1000). Application component 360 may output crediting information to billing component 380 (arrow 10.6). Based on receiving the crediting information, billing component 380 may apply the credit to the account (arrow 10.7).

While particular examples are shown in FIGS. 6-10, the above description is merely an example implementation. In practice, other examples are possible from what is described above in FIGS. 6-10.

FIG. 11 is a diagram of example components of device 1100. One or more of the devices described above (e.g., with respect to FIGS. 1-3, and 6-10) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, a while series of blocks have been described with regard to FIGS. 4 and 5, the order of the blocks may be modified in other implementations. Further, non-dependent blocks may be performed in parallel. Also, while particular example messages, displayed by STB 310, are shown in FIGS. 1, 2, and 6-10, in practice, the messages may be different than the examples shown.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, and 6-10), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar to, as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising: receiving, by one or more devices, error notifications from a plurality of set-top-boxes (STBs), wherein each particular STB, of the plurality of STBs, generates a particular error notification when a particular item of content has failed to play at the particular STB for at least a threshold duration of time, wherein the plurality of STBs are located in a particular geographic region, wherein the items of content that have failed to play at the plurality of STBs correspond to a same content title; determining, by the one or more devices, a first ratio of a first quantity of the STBs, that provided error notifications, to a second quantity of STBs located in the particular geographic region; determining, by the one or more devices, a second ratio of the first quantity of STBs, that provided error notifications, to a third quantity of STBs to which the content title was provided; determining, by the one or more devices, that the first ratio exceeds a first threshold ratio; determining, by the one or more devices, that the second ratio exceeds a second threshold ratio; determining, based on determining that the first and second ratios respectively exceed the first and second threshold ratios and by the one or more devices, that an outage has occurred in the particular geographic region and with respect to the content title; and crediting, based on determining that the outage has occurred in the particular geographic region and by the one or more devices, corresponding accounts, associated with each of the plurality of STBs, for an amount associated with the content that has failed to play at each of the plurality of STBs.

2. The method of claim 1, wherein determining that an outage has occurred further includes:
determining that the first quantity of STBs exceeds a threshold quantity.

3. The method of claim 1, wherein the content includes: on-demand content stored by a content storage server, or broadcasted pay-per-view content.

4. The method of claim 1, wherein crediting the corresponding accounts includes providing a cash credit or a credit for additional paid content.

5. The method of claim 1, further comprising:
determining a credit amount based on crediting policy information identifying a maximum credit benefit,
wherein crediting the corresponding accounts is based on determining the credit amount.

6. The method of claim 1, further comprising:
outputting information regarding the crediting of a particular account to a user device associated with the particular account.

7. A system comprising: a non-transitory memory device storing a plurality of processor-executable instructions; and a processor configured to execute the processor-executable instructions, wherein executing the processor-executable instructions causes the processor to: receive error notifications from a plurality of set-top-boxes (STBs), wherein each particular STB, of the plurality of STBs, generates a particular error notification when a particular item of content has failed to play at the particular STB for at least a threshold duration of time, wherein the plurality of STBs are located in a particular geographic region, wherein the items of content that have failed to play at the plurality of STBs correspond to a same content title; determine a first ratio of a first quantity of the STBs, that provided error notifications, to a second quantity of STBs located in the particular geographic region; determine a second ratio of the first quantity of STBs, that provided error notifications, to a third quantity of STBs to which the content title was provided; determine that the first ratio exceeds a first threshold ratio; determine that the second ratio exceeds a second threshold ratio; determine, based on determining that the first and second ratios respectively exceed the first and second threshold ratios, that an outage has occurred in the particular region and with respect to the content title; and credit, based on determining that the outage has occurred in the particular geographic region, corresponding accounts, associated with each of the plurality of STBs, for an amount associated with the content that has failed to play at each of the plurality of STBs.

8. The system of claim 7, wherein executing the processor-executable instructions, to determine that an outage has occurred, causes the processor to:
determine that the first quantity of STBs exceeds a threshold quantity.

9. The system of claim 7, wherein the content includes: on-demand content stored by a content storage server, or broadcasted pay-per-view content.

10. The system of claim 7, wherein executing the processor-executable instructions, to credit the corresponding accounts, causes the processor to provide a cash credit or a credit for additional paid content.

11. The system of claim 7, wherein executing the processor-executable instructions further causes the processor to:
determine a credit amount based on crediting policy information identifying a maximum credit benefit,
wherein executing the processor-executable instructions, credit the corresponding accounts, causes the processor to credit the corresponding accounts based on determining the credit amount.

12. The system of claim 7, wherein executing the processor-executable instructions further causes the processor to:
output information regarding the crediting of a particular account to a user associated with the particular account.

13. The system of claim 7, wherein executing the processor-executable instructions further causes the processor to: receive activity logs, from the plurality of STBs, the received activity logs having one or more error codes relating to the interruption or failure of a particular STB, of the plurality of STBs, to receive the particular item of content, the particular activity log being received from the particular STB, wherein executing the processor-executable instructions, to determine that the outage has occurred, causes the processor to determine that the outage has occurred further based on information in the identified particular activity log having the one or more error codes.

14. A non-transitory computer-readable medium, storing: a plurality of instructions which, when executed by one or more processors associated with a device, cause the one or more processors to: receive error notifications from a plurality of set-top-boxes (STBs) that are located in a particular geographic region, wherein each particular STB, of the plurality of STBs, generates a particular error notification when a particular item of content has failed to play at the particular STB for at least a threshold duration of time, wherein the items of content that have failed to play at the plurality of STBs correspond to a same content title; determine a first ratio of a first quantity of the STBs, that provided error notifications, to a second quantity of STBs located in the particular geographic region; determine a second ratio of the first quantity of STBs, that provided error notifications, to a third quantity of STBs to which the content title was provided; determine that the first ratio exceeds a first threshold ratio; determine that the second ratio exceeds a second threshold ratio; determine, based on determining that the first and second ratios respectively exceed the first and second threshold ratios, that an outage has occurred in the particular region and with respect to the content title; and credit, based on determining that the outage has occurred in the particular geographic region, corresponding accounts, associated with each of the plurality of STBs, for an amount associated with the content that has failed to play at each of the plurality of STBs.

15. The non-transitory computer-readable medium of claim 14, wherein one or more instructions, of the plurality of instructions, to determine that an outage has occurred, further causes the one or more processors to:
determine that the first quantity of STBs exceeds a threshold quantity.

16. The non-transitory computer-readable medium of claim 14, wherein the content includes: on-demand content stored by a content storage server, or broadcasted pay-per-view content.

17. The non-transitory computer-readable medium of claim 14, wherein one or more instructions, of the plurality of instructions, to credit the corresponding accounts, cause the one or more processors to provide a cash credit or a credit for additional paid content.

18. The non-transitory computer-readable medium of claim 16, wherein the plurality of instructions further causes the one or more processors to:
determine a credit amount based on crediting policy information identifying a maximum credit benefit,
one or more instructions, of the plurality of instructions, to credit the corresponding accounts, cause the one or more processors to credit the corresponding accounts based on determining the credit amount.

19. The non-transitory computer-readable medium of claim 14, wherein one or more instructions of the plurality of instructions, further cause the one or more processors to: receive activity logs from the plurality of STBs, wherein one or more of the activity logs includes an error code relating to a failure to play content; and filter the activity logs to identify particular activity logs, of the received activity logs, having error codes relating to the failure of the STBs to play the particular item of content, wherein one or more instructions, of the plurality of instructions, to determine that the outage has occurred, cause the one or more processors to determine that the outage has occurred further based on information in the identified activity logs having the error codes.

20. The method of claim 1, further comprising:
confirming the error notifications received from the plurality of STBs, wherein confirming the error notification from the particular STB includes:
outputting a confirmation request to the particular STB, and
receiving a response to the confirmation request,
wherein determining that the outage has occurred is further based on the confirmation of the error notifications.

* * * * *